United States Patent [19]

Berkeley

[11] Patent Number: 5,017,180

[45] Date of Patent: May 21, 1991

[54] SPEED REDUCTION DEVICE

[75] Inventor: James E. Berkeley, Dayton, Ohio

[73] Assignee: Shopsmith, Inc., Dayton, Ohio

[21] Appl. No.: 442,752

[22] Filed: Nov. 29, 1989

[51] Int. Cl.5 ............................................. F16H 9/00
[52] U.S. Cl. ...................................... 474/84; 74/393; 82/142; 144/1 R
[58] Field of Search .................. 474/69, 70, 84, 87, 474/88, 8, 24, 25, 27; 74/393, 396, 217; 82/142, 143, 144, 905; 144/1 R, 278 R; 403/362

[56] References Cited

U.S. PATENT DOCUMENTS

| | | | |
|---|---|---|---|
| 439,316 | 10/1890 | White . | |
| 446,407 | 2/1891 | Masters . | |
| 497,630 | 5/1893 | Conradson . | |
| 2,029,053 | 1/1936 | Brennen | 474/70 |
| 2,103,464 | 12/1937 | Judelshon | 82/21 |
| 2,193,279 | 3/1940 | Groene et al. | 82/143 |
| 2,394,209 | 0/1942 | Scuse | 82/2 |
| 2,538,667 | 1/1951 | Chamberlin | 74/217 |
| 2,641,137 | 6/1953 | Orcutt et al. | 74/217 |
| 2,694,175 | 11/1954 | Davis | 322/42 |
| 2,694,937 | 11/1954 | Birbaum | 74/336 |
| 2,804,759 | 9/1957 | Hartmann | 403/362 |
| 2,885,896 | 5/1959 | Hungerford, Jr. et al. | 74/217 |
| 2,885,897 | 5/1959 | Pettigrew | 82/142 |
| 2,948,374 | 8/1960 | Husband | 474/79 |
| 3,124,178 | 3/1964 | Packard | 144/1 R |
| 3,282,309 | 11/1966 | Parker et al. | 144/1 |
| 3,429,192 | 2/1969 | Allen | 74/217 |
| 3,566,708 | 3/1971 | Brahm | 74/393 |
| 3,884,089 | 5/1975 | Avramidis | 74/217 |
| 4,276,037 | 6/1981 | Ryan et al. | 474/70 |
| 4,349,945 | 9/1982 | Fox | 144/1 R |
| 4,861,319 | 8/1989 | Kemp | 474/69 |

Primary Examiner—Thuy M. Bui
Attorney, Agent, or Firm—Biebel, French & Nauman

[57] ABSTRACT

A speed reducing device is provided for use with a multi-purpose woodworking tool such that faceplate turning operations may be performed on large diameter workpieces. The device includes a housing which partially supports input and output shafts passing through opposite sides of the housing. An end of the input shaft located within the housing is formed with a hole for receiving an end of the output shaft within the housing such that the input and output shafts coact with one another to support each other and prevent one another from pivoting about the points at which they are supported by the housing. The input and output shafts rotate relative to one another and are both connected to a sheave by a pair of belts such that the input shaft may be driven by the output spindle of a woodworking tool at a first speed and the output shaft will be driven by the belts and sheave at a slower speed which is acceptable for turning large diameter workpieces.

20 Claims, 3 Drawing Sheets

SPEED REDUCTION DEVICE

BACKGROUND OF THE INVENTION

The present invention relates to speed reduction devices and, more particularly, to speed reduction devices for use with powered multi-purpose woodworking tools.

Multi-purpose woodworking tools typically include a frame, a pair of parallel way tubes extending along a longitudinal dimension of the frame, and a headstock mounted for slidable adjustment on the way tubes. The headstock includes a motor and power transmission system having an output spindle. The output spindle of the headstock may drive various woodworking tools such as tablesaws, lathes, shapers, disc sanders, jointers, bandsaws and the like, which are mounted on the way tubes.

An example of a typical multi-purpose woodworking tool is shown in U.S. Pat. No. 3,282,309 to Parker et al in which a variety of woodworking tools may be powered directly by the output spindle of the headstock of the machine. The headstock is typically provided with means for varying the speed of the output spindle to accommodate the requirements of the particular tool being used. Thus, a higher spindle speed may be used for operations such as sawing and a slower spindle speed may be used for operations such as lathe turning. While such an arrangement is acceptable for many woodworking operations, the lowest spindle speed available is often too high for faceplate turning operations involving large diameter workpieces such as plates and bowls.

Devices which are designed exclusively for lathe turning are typically provided with a series of shafts and interconnecting belts as shown in U.S. Pat. No. 2,103,464 to Judelshon and U.S. Pat. No. 2,394,209 to Scuse. These two patents disclose devices in which an intermediate shaft is driven through a belt by a motor and the intermediate shaft drives an output shaft at a lower speed than the motor output shaft speed. Both of these machines require a great deal of space and are not readily adaptable for use with a multi-purpose woodworking tool such as the one shown by Parker et al.

Consequently, there is a need for a speed reduction device which may be attached to an existing powered woodworking tool having a headstock mounted on a pair of parallel way bars such that the output speed of the speed reduction device is sufficiently low to permit faceplate turning operations to be performed with large diameter workpieces.

In addition, a speed reduction device is needed which is compact enough to be supported by the way bars of a multi-purpose woodworking tool and which has an output shaft located at the same height as the output spindle of the headstock.

SUMMARY OF THE INVENTION

The present invention provides a compact speed reducing device which may be mounted upon the way bars of a powered multi-purpose woodworking tool. In addition, the present invention provides means for quickly connecting and disconnecting the speed reducing device to and from the woodworking tool.

In a preferred embodiment of the present invention, the speed reduction device is provided with a housing having front and rear halves, with the halves forming opposing front and rear walls of the housing.

A clamping sleeve is attached to the rear wall of the housing and is sized to fit over the end of the headstock and output spindle of a multi-purpose woodworking tool so as to clamp the speed reducing device to the headstock. In addition, a clamp is attached to the lower portion of the front half of the housing and is configured to engage both of the way bars for vertically supporting and clamping the speed reducing device to the woodworking tool.

An input shaft passes through the rear wall of the speed reduction device such that an end thereof extends into the housing, and an opposite end is positioned outside of the housing for attachment to the output spindle of the powerhead. The input shaft is supported by bearings where it passes through the rear wall of the housing and the end of the input shaft within the housing is formed with a hole therein.

An output shaft for the speed reduction device passes through the front wall of the housing such that an end thereof extends into the housing and is engaged within the hole in the input shaft. The output shaft is partially supported by a bearing located at the front wall of the housing. Bearings are provided between the input and output shafts such that the shafts may easily rotate relative to one another, and the input and output shafts coact with one another within the housing to prevent each other from pivoting about the points at which they are supported by the rear and front walls of the housing.

Also in the preferred embodiment, the input and output shafts are provided with first and second pulley portions, respectively, and a sheave having third and fourth pulley portions is mounted on an idler shaft having a longitudinal axis parallel to the input and output shafts. The first pulley portion has a smaller diameter than the third pulley portion, and the fourth pulley portion has a smaller diameter than the second pulley portion. A first belt extends around the first and third pulley portions and a second belt extends around the second and fourth pulley portions such that as the output spindle drives the input shaft, the belts and sheave cause the output shaft to rotate at a lower speed than the input shaft.

Other objects and advantages of the invention will be apparent from the following description, the accompanying drawings, and the appended claims.

DETAILED DESCRIPTION OF THE PREFERRED EMBODIMENT

Figure 1:
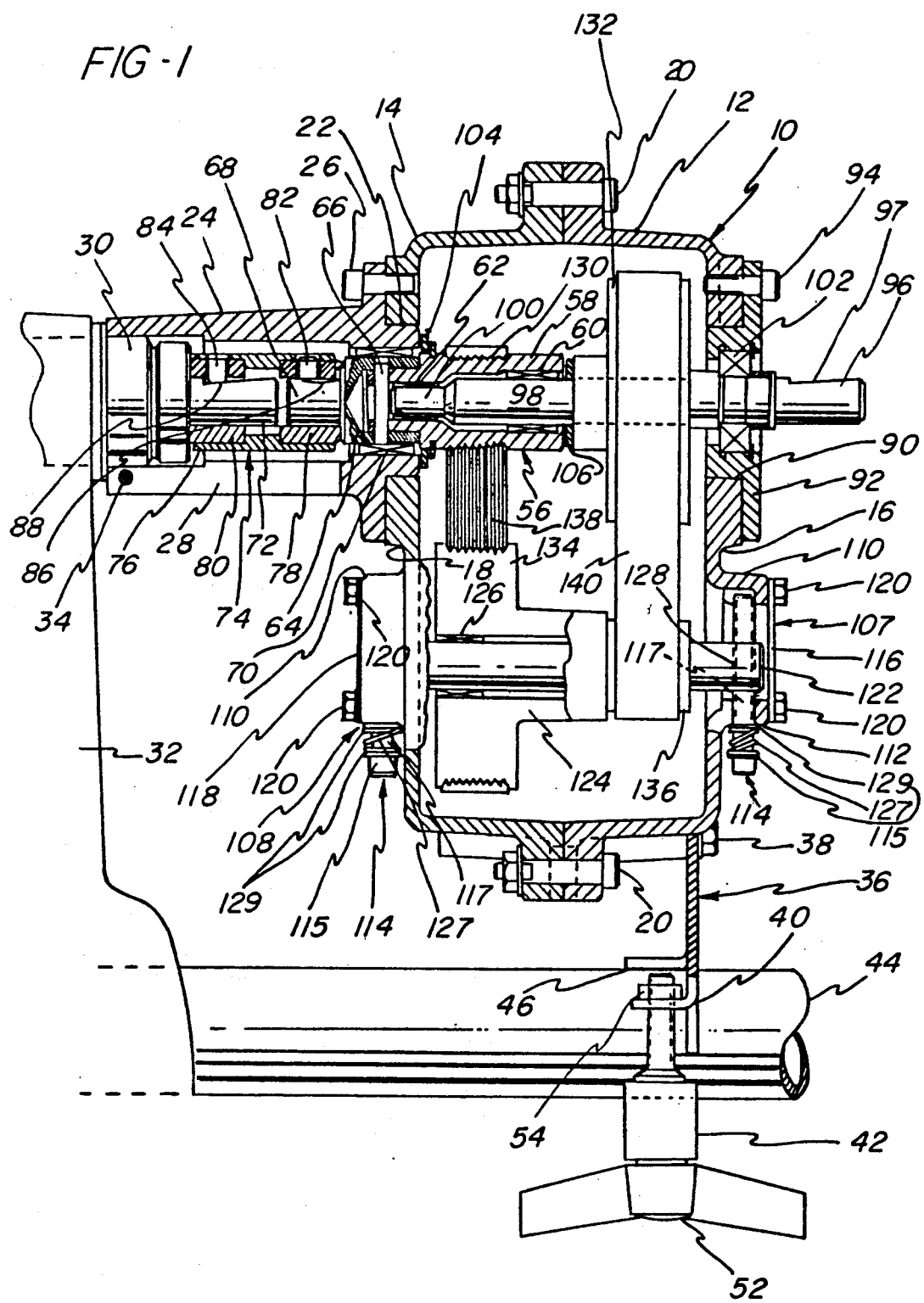
FIG. 1 is a side elevational view of the speed reduction device of the present invention shown in partial cross-section to reveal essential operating elements of the device.

Referring to FIG. 1, the speed reduction device of the present invention includes a housing 10 having a front half 12 and a rear half 14. The front half 12 of the housing 10 includes a front wall 16 and the rear half 14 of the housing includes a rear wall 18. The front and rear halves 12, 14 of the housing 10 are joined together by a pair of bolt assemblies 20 such that the front and rear walls 16, 18 are positioned opposing one another and the housing 10 is formed as a substantially sealed enclosure.

The rear wall 18 of the housing 10 is formed with an aperture 22 in an upper portion thereof. A substantially tubular elongated clamping sleeve 24 is positioned within the aperture 22 and attached to the rear wall 18 by a plurality of bolts 26. The clamping sleeve 24 includes an elongated slit, one wall of which is shown at 28, which facilitates positioning the clamping sleeve over an end 30 of a headstock 32 of a multi-purpose woodworking tool. A fastener 34 is provided for tightening the clamping sleeve 24 around the end 30 of the headstock 32 such that the housing 10 is maintained in position relative to the headstock 32.

Figure 2:
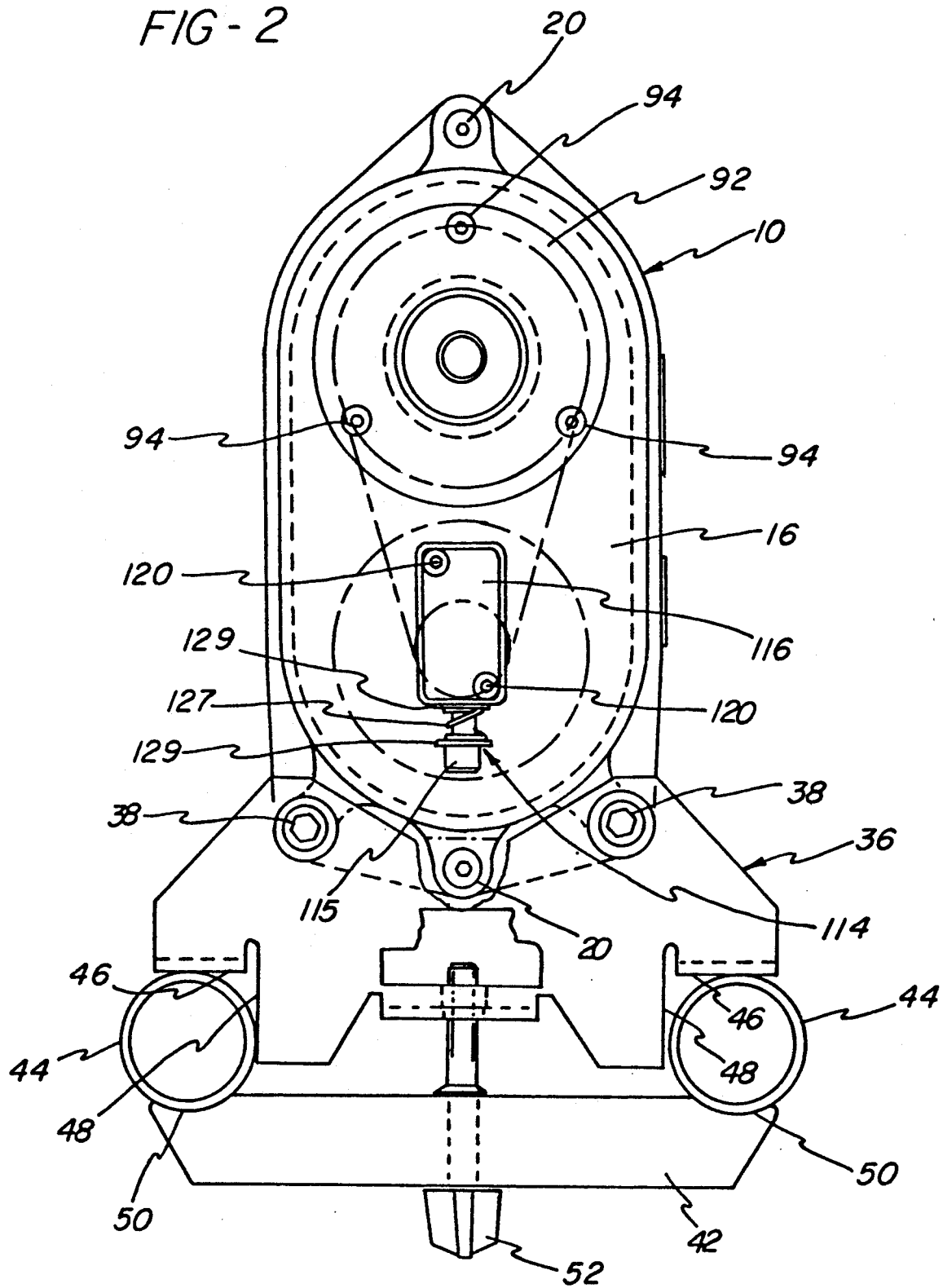
FIG. 2 is a front elevational view of the device.

As may be seen in FIGS. 1 and 2, a supporting clamp 36 is attached adjacent to the front wall 16 by means of bolts 38 and includes a top clamp portion 40 and a bottom clamp portion 42. The top and bottom clamp portions 40, 42 extend transverse to and engage a pair of parallel way tubes 44 which also support the headstock 32 of the woodworking tool. The upper clamp portion 40 includes top and side portions 46, 48 for engaging the top and side of each of the way tubes 44, and the lower clamping portion 42 includes arcuately-shaped portions 50 for engaging the bottoms of the way tubes 44. A screw member 52 is positioned below and passes through the lower clamping portion 42 and engages a threaded element 54 positioned on the upper clamping portion 40 such that the screw element 52 may draw the upper and lower clamping portions 40, 42 together to firmly hold and vertically support the housing 10 in place upon the way tubes 44.

An input shaft assembly 56 passes through the clamping sleeve 24 and through the rear wall 18 into the housing 10. The input shaft assembly 56 includes a sleeve 58 formed with a first large diameter portion in which a first needle bearing 60 is positioned, and a second smaller diameter portion within which a second needle bearing 62 is positioned. A cap 64 is rigidly connected to the sleeve 58 by means of a connecting pin 66. The cap 64 is positioned adjacent to and passes through the housing wall 18 and includes a shaft portion 68 which extends into the clamping sleeve 24. The input shaft assembly 56 is partially supported at the rear housing wall 18 by means of a needle bearing 70 positioned within the end of the clamping sleeve 24 and located between the cap portion 64 and the rear housing wall 18.

The shaft portion 68 of the input shaft assembly 56 is connected to an output spindle 72 of the headstock 32 by means of a coupling assembly 74. The coupling assembly 74 includes a connecting sleeve 76 with front and rear inserts 78, 80 positioned at either end of the sleeve 76. A pair of set screws 82, 84 pass through the sleeve 76 and inserts 78, 80 at either end of the coupling assembly 74 to engage flat keyed portions 86, 88 formed in the shaft portion 68 and output spindle 72 respectively. In addition, the clamping sleeve 24 may be formed with apertures (not shown) to permit access to the clamping screws 82, 84 for facilitating attachment and detachment of the coupling assembly 74 to and from the output spindle 72 and the shaft portion 68 of the input shaft assembly 56.

The front wall 16 includes an aperture 90 formed in an upper portion thereof and located opposite from the aperture 22 formed in the rear wall 18 of the housing 10. A coverplate 92 is positioned in the aperture 90 and is held in place on the front wall 16 by a plurality of bolts 94.

An output shaft 96 having an end formed with a flat keyed portion 97 for receiving a workpiece passes through the plate 92 such that an end opposite from the keyed end extends into the housing 10. The end portion of the output shaft 96 which is positioned within the housing 10 is received within the hole in the sleeve 58 of the input shaft assembly 56 and is provided with a first large diameter portion 98 for engaging the bearing 60 and a smaller diameter portion 100 for engaging the bearing 62.

The output shaft 96 is partially supported by the front wall 16 and is engaged by a bearing 102 which is located in the plate 92 between the output shaft 96 and the front housing wall 16. Thus, it can be seen that the input and output shafts 56, 96 are each supported by a single bearing 70, 102, respectively, at the housing walls 18, 16 and are further supported by one another within the housing through means of bearings 60 and 62 such that the input and output shafts 56, 96 are prevented from pivoting about the points at which they pass through the front and rear walls 16, 18. This configuration of the shafts provides a compact structure by which the distance from the output spindle 72 to the end of the output shaft 96 is kept to a minimum.

The above structure permits the input shaft assembly 56 and the output 96 to rotate independently of one another while being maintained nested together and aligned longitudinally. In addition, thrust bearings 104, 106 are provided to facilitate the rotation of the input shaft assembly 56 and output shaft 96 while they are maintained in their proper horizontal position.

Front and rear chambers 107, 108 are formed on and protrude outwardly from a lower portion of the front and rear walls 16, 18 of the housing 10. Each chamber 107, 108 includes an upper horizontal wall 110 and a lower horizontal wall 112 located opposite from the upper wall 110. A pair of threaded draw bolts 114, each having a head 115 and a shank portion 117, pass upwardly through the lower walls 112 of respective chambers 107, 108 and extend to a location adjacent to the upper wall 110. Front and rear plates 116, 118 are attached to the chambers 107, 108 by a plurality of bolts 120 for closing the outer ends of the chambers 107, 108, as well as providing access to the lower portion of the housing 10.

An idler shaft 122 is positioned in the lower portion of the housing 10 parallel to the input shaft assembly 56 and the output shaft 96 with its ends extending into the chambers 107, 108, and a sheave 124 is mounted for rotational movement on the idler shaft 122 by means of bearings 126. Each end of the idler shaft 122 is formed with a threaded aperture 128 for receiving a shank portion 117 of one of the threaded draw bolts 114. In addition, a coil spring 127 is positioned between the heads 115 of the bolts 114 and the lower walls 112, and washers 129 are located at each end of the springs 127 to form spring seats, such that the heads 115 of the bolts 114 are spring biased away from the lower wall 112, and the idler shaft 122 may be positioned within the housing 10 by rotation of the bolts 114.

The input shaft assembly 56 and output shaft 96 are formed with first and second pulley portions 130 and 132, respectively, and the sheave 124 is formed with third and fourth pulley portions 134 and 136, respectively, located opposite from the first and second pulley portions 130, 132. The first pulley portion 130 is formed with a smaller diameter than the third pulley portion 134 and the fourth pulley portion 136 is formed with a smaller diameter than the second pulley portion 132, and a first belt 138 extends around the first and third pulley portions 130, 134 while a second belt 140 extends around the second and fourth pulley portions 132, 136.

Thus, as the input shaft assembly 56 is driven by the output spindle 72 at a first speed, the input shaft assembly 56 drives the first belt 138 such that the sheave 124 is rotated at a lower speed than the input shaft assembly 56. The sheave 124 in turn drives the second belt 140 to rotate the output shaft 96 at a lower speed than the sheave 124. In the preferred embodiment, the output spindle 72 drives the input shaft assembly 56 at a speed of approximately 700 rpm and the output shaft 96 of the speed reducing device has a rotational speed of approximately 100 rpm.

The draw bolts 114 engaged within the threaded apertures 128 formed in the idler shaft 122 may be rotated to move the idler shaft 122 either toward or away from the input shaft assembly 56 and output shaft 96 to either increase or decrease the tension on the belts 138, 140, and the springs 127 permit the bolts 114 and idler shaft 122 to undergo a small amount of vertical displacement while maintaining a minimum amount of tension on the belts 138, 140, as set by the bolts 114. It should be noted that as the tension is increased on the belts 138, 140, the bearings 60, 62 coact with the input shaft assembly 56 and output shaft 96 to counteract the pivoting forces produced by the belts 138, 140 tending to pivot the input assembly 56 and output shaft 96 downwardly toward the sheave 124 and idler shaft 122.

Figure 3:
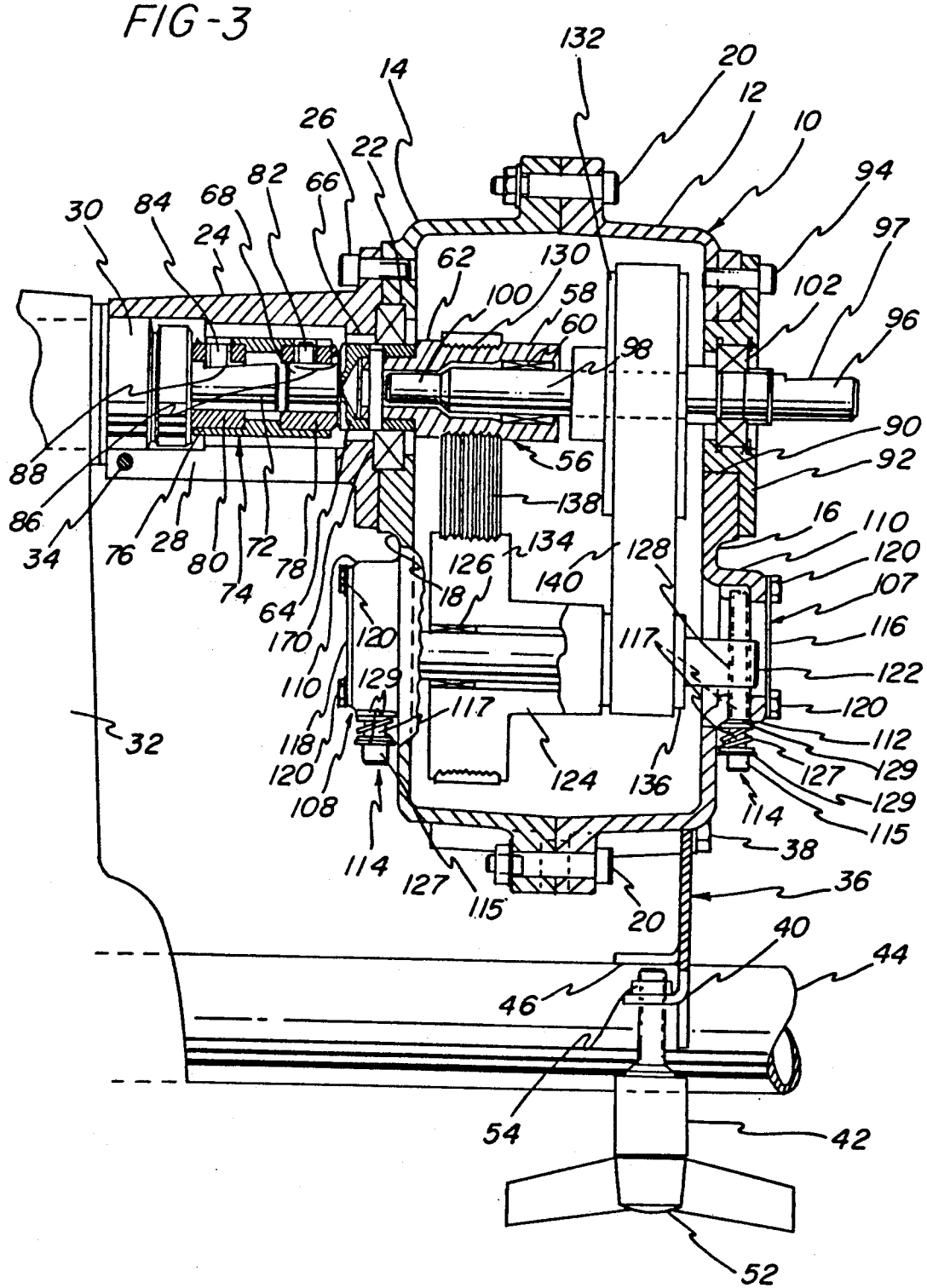
FIG. 3 is a side elevational view of a second embodiment of the speed reduction device of the present invention.

FIG. 3 shows an alternative embodiment of the present invention, wherein the same reference numerals are used for the elements which are unchanged from the embodiment of FIG. 1. In this embodiment, the thrust bearings 104, 106 have been eliminated and the needle bearing 70 has been replaced by a ball bearing 170. The ball bearing 170 performs the function of both the thrust bearings 104, 106 and the needle bearing 70 in that it supports the shaft assembly 56 for rotational movement as well as acting to maintain the shaft assembly 56 in the proper horizontal position.

It should be noted that means other than a belt and pulley system may be provided for causing engagement between the input shaft assembly 56, the output shaft 96 and the sheave 124. For example, the input shaft assembly 56, output shaft 96, and sheave may be provided with gears instead of the pulley portions 130, 132, 134, 136, shown in FIG. 1, and a pair of chains may be mounted over the gears in place of the belts 138, 140 to provide the necessary drive connection from the input shaft assembly 56 down to the sheave 124 and from the sheave 124 up to the output shaft 96.

Alternatively, the pulley portions 130, 132, 134, 136 may be replaced by gears wherein a gear on the input shaft assembly 56 contacts and drives a gear on the sheave 124, and a gear on the sheave 124 contacts and drives a gear on the output shaft 96.

As is apparent from the above description, the present invention provides a compact device for reducing the speed of a multi-purpose woodworking tool such that faceplate turning operations may be performed on large diameter workpieces. In addition, a speed reducing device is provided which is easily installed and removed as a unit such that a minimum number of steps are required for combining the device with a multi-purpose woodworking tool.

While the form of apparatus herein described constitutes a preferred embodiment of the invention, it is to be understood that the invention is not limited to this precise form of apparatus, and that changes may be made therein without departing from the scope of the invention which is defined in the appended claims.

What is claimed is:

1. A speed changing device for use with a woodworking tool comprising:
   a front and a rear portion located opposite from one another;
   an input shaft partially supported by said rear portion such that an end thereof is located between said front and rear portions;
   an output shaft partially supported by said front portion such that an end thereof is located between said front and rear portions;
   one of said input and output shafts being provided with means defining a hole in said end thereof located between said front and rear portions, said hole receiving an end of the other of said shafts therein, such that said shafts act to prevent one another from pivoting about the locations at which they are supported by said front and rear portions;
   rotating transmission means having an axis of rotation parallel to said input and output shafts;
   first engagement means for connecting said input shaft to said rotating transmission means; and
   second engagement means for connecting said output shaft to said rotating transmission means;
   said input shaft acting to drive said output shaft through said engagement means and said transmission means such that, as said input shaft is rotated at a first speed, said output shaft is driven at a second speed different from said first speed.

2. The speed changing device of claim 1 wherein said rotating transmission means comprises a sheave.

3. The speed changing device of claim 2 wherein said engagement means comprises pulley portions formed on said input and output shafts and said sheave, a first belt extending around said input shaft and said sheave and a second belt extending around said output shaft and said sheave.

4. The speed changing device of claim 3 wherein said hole in said one shaft is formed with a large and a small diameter portion and said end of said other shaft received within said hole is formed with a large and a small diameter portion for receipt in corresponding large and small portions of said hole.

5. The speed changing device of claim 4 wherein said hole is formed in said input shaft.

6. The speed changing device of claim 5 said output shaft is driven at a lower speed than said input shaft.

7. A speed changing device for use with a woodworking tool comprising:
   a housing having a front and a rear wall;
   an input shaft passing through and being partially supported by said rear wall such that an end of said input shaft extends into said housing;
   an output shaft passing through and being partially supported by said front wall such that an end of said output shaft extends into said housing;
   one of said input and output shafts being provided with means defining a hole in said end thereof located within said housing, said hole receiving an end of the other of said shafts therein, such that said shafts act to prevent one another from pivoting about the locations at which they are supported by said walls;

a sheave positioned within said housing and oriented parallel to said input and output shafts;

first and second belts passing around said input and output shafts, respectively, said belts also passing around said sheave such that as said input shaft is driven at a first speed, said belts and said sheave act to drive said output shaft at a second speed different from said first speed.

8. The speed changing device of claim 7 wherein said hole in said one shaft is formed with a large and a small diameter portion and said end of said other shaft received within said hole is formed with a large and a small diameter portion for receipt in corresponding large and small portions of said hole.

9. The speed changing device of claim 8 wherein said hole is formed in said input shaft.

10. The speed changing device of claim 7 including a headstock formed on said woodworking tool and having a horizontal output spindle shaft and said speed changing device being provided with means for attaching said rear wall to said headstock and means for attaching said input shaft to said output spindle.

11. The speed changing device of claim 10 wherein a connecting sleeve is provided for attaching said input shaft to said output spindle, said connecting sleeve fitting over said output spindle and input shaft and being provided with a pair of set screws for engaging said shafts.

12. The speed changing device of claim 10 wherein a support is attached adjacent to said front wall for providing vertical support for said device on said woodworking tool.

13. The speed changing device of claim 12 including a pair of way tubes formed on said woodworking tool for supporting said headstock and said speed changing device support being formed with an upper member for abutting top and side portions of said tubes, and a bottom member which is drawn toward said top member by a screw to abut a bottom portion of said tubes.

14. The speed changing device of claim 7 wherein said output shaft is driven at a lower speed than said input shaft.

15. The speed changing device of claim 14 wherein said sheave is rotatably mounted on an idler shaft mounted in said housing.

16. The speed changing device of claim 15 wherein a threaded draw bolt is provided at said front and rear walls of said housing and said idler shaft is provided with means defining a threaded aperture at each end thereof, said threaded apertures receiving said draw bolts such that rotation of said draw bolts results in movement of said idler shaft toward or away from said input and output shafts.

17. The speed changing device of claim 15 wherein said input and output shafts are formed with first and second pulley portions, respectively, and said sheave is formed with third and fourth pulley portions, said first belt extending around said first and third pulley portions and said second belt extending around said second and fourth pulley portions.

18. The speed changing device of claim 17 wherein said first pulley portion has a smaller diameter than said third pulley portion and said second pulley portion has a larger diameter than said fourth pulley portion.

19. A speed reduction device for connection to a multipurpose woodworking tool having a headstock with a horizontal output spindle, said speed reduction device comprising:

a housing having front and rear halves and means for holding said halves together, said halves including opposed front and rear walls;

a clamping sleeve attached to an upper portion of said rear wall for attaching said rear half of said housing to said headstock of said woodworking tool;

a lower clamp attached to said front half of said housing for vertically supporting and attaching said speed reduction device to said woodworking tool;

an input shaft passing through said clamping sleeve and said rear wall such that an end of said input shaft extends into said housing;

a coupling assembly for connecting said output spindle of said woodworking tool to said input shaft, said coupling assembly fitting over said output spindle and said input shaft and being provided with a pair of set screws for engaging said spindle and said shaft;

a first bearing located between said input shaft and said rear wall of said housing for rotatably supporting said input shaft;

a plate attached to an upper portion of said front half of said housing and an output shaft passing through said front wall and said plate such that an end of said output shaft extends into said housing;

a second bearing located between said output shaft and said front wall for rotatably supporting said output shaft;

said output shaft being formed with a large diameter portion and a small diameter portion;

said input shaft having means defining a hole in said end thereof located within said housing, and means defining a large diameter portion of said hole for receiving part of said large diameter portion of said output shaft and a small diameter portion of said hole for receiving said small diameter portion of said output shaft;

a third bearing located between said large diameter portion of said output shaft and said means defining said large diameter portion of said hole in said input shaft;

a fourth bearing located between said small diameter portion of said output shaft and said means defining said small diameter portion of said hole in said input shaft;

said third and fourth bearings permitting said input and output shafts to rotate relative to one another;

front and rear chambers formed in a lower portion of said front and rear walls, said chambers having upper and lower horizontal walls;

front and rear draw bolts having a head and a shank portion and passing through said lower walls of said front and rear chambers, respectively, said shank portions being threaded and extending from said lower wall to a point adjacent to said upper wall;

a coil spring positioned on each of said bolts and located between said heads of said bolts and said lower horizontal walls;

an idler shaft having threaded apertures in each end thereof, said shank portion of said draw bolts passing through said threaded apertures to adjustably mount said idler shaft parallel to said input and output shafts such that rotation of said draw bolts results in movement of said idler shaft toward or away from said input and output shafts;

a sheave mounted for rotational movement on said idler shaft;

first and second pulley portions formed on said input shaft and said output shaft, respectively;

third and fourth pulley portions formed on said sheave, said second and said third pulley portions each having a larger diameter than both said first and said fourth pulley portions;

a first belt extending around said first and said third pulley portions to cause said sheave to rotate;

a second belt extending around said second and said fourth pulley portions to cause said output shaft to rotate;

said belts and said pulley portions causing said output shaft to rotate at a lower speed than said input shaft;

said first and second belts acting to bias said first and second pulley portions toward said third and fourth pulley portions, respectively; and said input shaft, said output shaft and said third and fourth bearings coacting with one another to prevent said input and output shafts from pivoting down toward said idler shaft.

20. The speed changing device of claim 1 including a headstock formed on said woodworking tool and having a horizontal output spindle shaft and said speed changing device being provided with means for attaching said rear portion to said headstock and means for attaching said input shaft to said output spindle.

* * * * *